United States Patent [19]

Tolliver et al.

[11] Patent Number: 5,309,691

[45] Date of Patent: May 10, 1994

[54] SHEAR CONNECTED STRUCTURAL UNITS

[76] Inventors: Wilbur E. Tolliver, 6371 Kuttshill, NE., Rockford, Mich. 49341; Larry R. Magnuson, 5586 Grand Haven Rd., Muskegon, Mich. 49441

[21] Appl. No.: 842,086

[22] Filed: Feb. 26, 1992

[51] Int. Cl.⁵ ............................................. E04C 5/18
[52] U.S. Cl. .................... 52/583.1; 52/583; 52/700; 52/701; 52/707; 138/155
[58] Field of Search .............. 52/583, 584, 585, 587, 52/601, 602, 700, 701, 707, 708, 709, 711, 595, 233, 403, 582; 405/135, 153; 403/305, 300, 13, 14

[56] References Cited

U.S. PATENT DOCUMENTS

| | | | |
|---|---|---|---|
| 1,579,285 | 4/1926 | Danaher. | |
| 2,158,302 | 5/1939 | Peirce. | |
| 3,333,388 | 8/1967 | Sandin | 52/701 |
| 4,047,388 | 9/1977 | Howlett | 61/45 R |
| 4,199,158 | 4/1980 | de Munck | 272/205 |
| 4,496,259 | 1/1985 | Foucher | 403/14 |
| 4,497,590 | 2/1985 | Chase | 405/152 |
| 4,606,671 | 8/1986 | Rasmussen | 403/359 |
| 4,781,006 | 11/1988 | Haynes | 52/583 |
| 4,830,536 | 5/1989 | Birch et al. | 405/153 |
| 4,900,607 | 2/1990 | Glang et al. | 428/131 |
| 4,946,309 | 8/1990 | Glang | 405/152 |
| 5,134,828 | 8/1992 | Baur. | |

FOREIGN PATENT DOCUMENTS

| | | | |
|---|---|---|---|
| 0645343 | 7/1962 | Canada | 52/711 |
| 1004186 | 5/1964 | United Kingdom | 52/711 |
| 1410970 | 10/1975 | United Kingdom. | |
| 1473861 | 5/1977 | United Kingdom. | |
| 2100772 | 1/1983 | United Kingdom | 405/135 |

Primary Examiner—Carl D. Friedman
Assistant Examiner—Christopher Todd Kent
Attorney, Agent, or Firm—Price, Heneveld, Cooper, DeWitt & Litton

[57] ABSTRACT

An apparatus for joining precast concrete units. A precast concrete unit, such as a section of pipe, decking and pavement includes a plurality of spaced, longitudinally aligned tubular members. The ends of each concrete unit are flush and are bounded by rounded edges to prevent chipping. The ends of the tubular members are flush with the end of the concrete unit. When two of such units are to be joined together, a guide member is inserted in one end of each tubular member on one concrete unit while an internally threaded insert member is inserted into each end of the tubular member in a second concrete unit. The guide members and insert members have axial apertures with the aperture in the insert member being internally threaded. The two precast concrete units are brought together so that the guide member on one concrete unit enters into the ends of the tubular members containing the inserts in the second concrete unit. A bolt is passed through each guide member and is threaded into the internally threaded aperture in the insert member. The bolts are tightened to join the two precast concrete units together. A resilient gasket can be cast into one end of a concrete unit when it is formed or can be inserted into a groove which is formed in a face of a precast concrete unit at the time it is formed. The gasket used in the groove is U-shaped and a resilient cord is inserted to the bottom of the groove to spread the sides of the gasket to securely lock it in place in the groove. The method of assembling precast concrete units is also disclosed.

14 Claims, 4 Drawing Sheets

SHEAR CONNECTED STRUCTURAL UNITS

BACKGROUND OF THE INVENTION

In the past, concrete pipe sections have been connected to form drains or culverts by using a male and female type of connection such as a bell and spigot and tongue-and-groove. The spigot is a tapered end while the bell is flared. The spigot end on one pipe is inserted into the flared end on another pipe. Rubber gaskets have been placed on the spigot with the gasket rings compressed in making the joint. The joint is then filled with mortar or asphalt to seal the pipe. As the pipe settles over time, the joints tend to open as the mortar or asphalt dries out and cracks.

In order to provide a more rigid and lasting connection, sections of concrete pipe were cast with the ends of reinforcing rods projecting out of the pipe at one end and with an aperture or recess at the other end for receiving the end of the reinforcing rod from a section of pipe to be joined. The ends of the reinforcing rods were threaded and washers and threaded nuts were used to fasten the sections together. This method presents a serious problem in that the threaded ends of the reinforcing rods can be damaged in shipping or in joining sections of pipe together, destroying the usefulness of the entire section of pipe.

Other techniques have also been used, such as hook-and-eye methods; however, these also suffered like the exposed reinforcing rods from damage in shipping or in assembling pipe sections together.

SUMMARY OF THE PRESENT INVENTION

In accordance with the present invention, an improved apparatus is provided for assembling precast concrete units, such as, pipe, decking, wall panels and pavement sections. The precast concrete units include a plurality of spaced longitudinally aligned tubular members. Each end of the concrete unit is substantially flush and is bounded by a rounded edge to reduce the tendency for chipping. The ends of the included tubular members are also preferably flush with the end surfaces of the concrete units. The thus prepared concrete units can be shipped or transported without fear of damage to the apparatus used to join the units together.

When the concrete unit arrives at the construction site, using precast concrete pipe as an example of the invention and not by way of limitation, the apparatus used to join the pipe sections together can then be installed. In sections of precast concrete box pipe, for example, the tubular members would be cast into the corners of the pipe in the space between the haunch of the pipe and the corner. The ends of each tubular member are preferably internally threaded. A guide member having a threaded portion and a shaped portion with a sloping or tapered surface is threaded into one end of each tubular member in one section of the precast concrete box pipe. The guide member has an axially aligned aperture and a circumferential shear surface on the shaped surface where the guide member abuts the end of the tubular member when threaded into place.

An insert member having an outer threaded surface and an internally threaded axial aperture is threaded into the internally threaded tubular members in a second section of precast concrete box pipe. The sections of pipe are then brought together and the projecting guide surfaces help to align the pipes as the guide members enter the end of the tubular member containing the internally threaded insert member. After the two sections of pipe are brought together and aligned, a threaded bolt is passed through the axial aperture in each guide member into the aperture in the insert member. The bolts are then tightened to firmly join the two sections of pipe together.

In order to provide a watertight seal between the two sections of pipe, a flexible gasket can be mounted on the end of the pipe. The gasket is preferably precast into one end of the pipe or a groove can be formed in the end of the pipe when it is cast. A flexible U-shaped gasket can be placed into the groove and a polymeric cord, an O-ring cord, can be forced to the bottom of the U-shaped gasket, between the spaced side portions of the gasket, to spread the gasket and securely lock it in place in the groove.

BRIEF DESCRIPTION OF THE DRAWINGS

For a more complete understanding of the present invention, and the advantages thereof, reference is now made to the following descriptions taken in conjunction with the accompanying drawings in which.

DETAILED DESCRIPTION OF THE PREFERRED EMBODIMENTS

Figure 1:
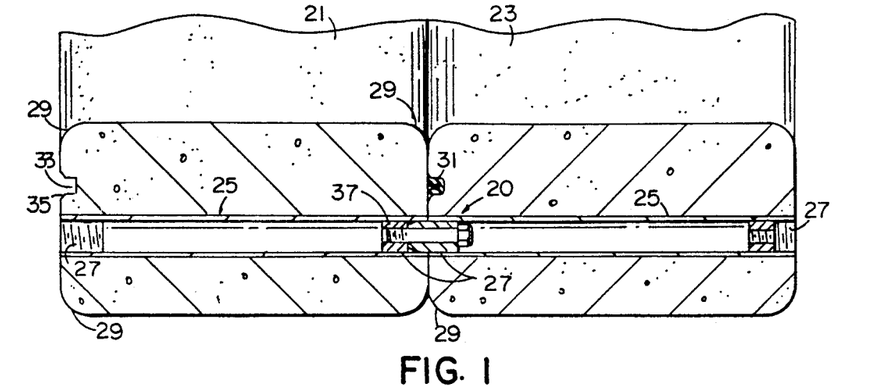
FIG. 1 is a fragmentary sectional view showing two concrete units joined together.

Referring to FIG. 1, a completed joint 20 is shown between two precast concrete units 21 and 23. The concrete units can be sections of a wall panel, pavement or decking such as that used in the assembly of bridges, buildings or parking structures. Concrete unit 21 has a tubular member 25 therein which is cast within the concrete when the unit is formed. Tubular member 25 is preferably internally threaded at each end 27. Tubular member 25 is preferably proportioned to the size of the concrete unit into which it is cast. For example, for a large concrete unit eight to twelve feet long, a steel tube approximately two and one-half inches in outside diameter would be used. The tube would preferably have one-quarter inch wall thickness so the internal diameter of the tube would be two inches.

Concrete unit 21 is cast with rounded edges 29 to reduce the tendency for chipping along the edge of the unit. The edges of cast concrete units, for example pipes, tend to chip in handling which, if bad enough, can make the section of pipe useless.

In order to provide a fluid-tight seal between the ends of the concrete units, a gasket should be used. The gasket can be embedded into the concrete when it is poured to form the unit or it can be inserted into a groove formed in the face of the concrete unit. The inserted gasket is preferred since it ca be added to and locked into the groove in the concrete unit at the construction site prior to joining the concrete units. It is also within the scope of the present invention to attach a gasket to an end of a concrete unit by means of an adhesive material. As shown in FIG. 1, the gaskets 31 are of the type which are inserted into a precast groove 33 in the end of the concrete unit. Groove 33 is provided with diverging walls 35 which provide a space for the gasket material to spread, as shown in concrete unit 23 when the units ar brought together.

Concrete unit 23 also has a tubular member 25 cast therein at the time it is formed. The tubular member, like member 25 in concrete member 21, has internally threaded ⓔnd portions 27.

Figure 3:
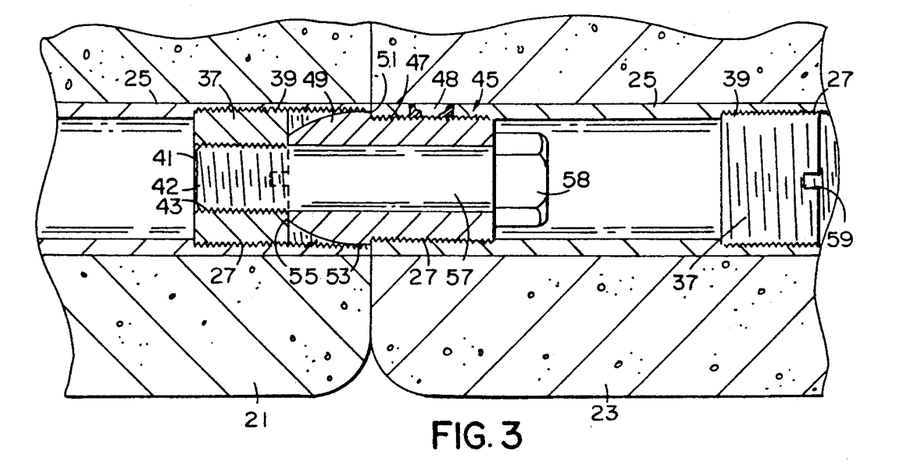
FIG. 3 is an enlarged fragmentary sectional view of a completed joint formed between two precast concrete units.

Prior to joining concrete units 21 and 23, and referring to FIG. 3 for clarity, an insert member 37 is threaded into tubular member 25 in concrete unit 21. Insert member 37 is made of steel and has an externally threaded portion 39 and an axial aperture or bore 41 which has an internal thread 43. A guide member 45 is threaded into tubular member 25 in concrete unit 23. Guide member 45 has a first threaded portion 47 which can be threaded into the end of tubular member 25 in concrete unit 23. Guide member 45 has a shaped end portion 49 which is preferably larger in diameter than threaded portion 47 forming a shoulder 51 which abuts the end of tubular member 25 when the guide member is threaded fully into position in the tubular member. Extending a short distance away from shoulder 51 is a circumferential shear band 53 which provides shear strength to the joint formed between the two concrete units. The shear band is approximately one-quarter inch in width. The shaped surface of the guide member then slopes toward an edge 55 which abuts the insert member 37 when guide member 45 is inserted into concrete unit 21. Guide member 45 has an axial aperture or bore 57 which extends through the guide member and aligns with aperture 42 in insert member 37.

While it is preferred to employ internally threaded tubular members and threaded insert and guide members, it is within the scope of the present invention to use unthreaded members. Referring to FIG. 3, a port 48 is shown for providing access to the first portion of the guide member for welding it in place in the tubular member. A similar port can be provided for welding the insert member in place. The edge of the insert member can also be welded in place by reaching in through the open end of the tubular member with a welding rod. The axial shear bolt would still be used for joining the concrete units together.

Whether a threaded or smooth surfaced tubular member is used, it is important to keep the guide member from turning when the shear bolt is tightened. As can be seen in FIG. 3, when bolt 58 is tightened by turning in a clockwise direction, guide member 45 can unscrew out of the tubular member if it turns in the same direction. The rotation of the guide member 45 can be prevented by threading it tightly into the tubular member. A small amount of adhesive can be used to glue the guide member in position. Also a small tack weld will hold it in place. A lock washer can also be used on the shear bolt between the insert member and the end of the guide member. While the lock washer can function to restrict rotation of the guide member, it is not preferred since it requires the use and handling of another part.

The concrete units are assembled moving from left to right, as shown in FIGS. 1 and 3. Insert member 37 is threaded into the end of tubular member 25 in concrete unit 21. Guide member 45 is threaded into the end of tubular member 25 in concrete unit 23. The concrete units are then brought together bringing end 49 of guide member 45 into the end of tubular member 25 in concrete unit 21. Face 55 on the guide member preferably abuts against the face of insert member 39. The axial passage 57 in guide member 45 aligns with axial passage 42 in insert member 39. A threaded bolt s is then inserted through tubular member 25 in concrete unit 23 and passes through guide member 45 to the internally threaded aperture in insert member 39. The bolt is then tightened to firmly join the two concrete units together. After the joint is completed, another insert member 37 is threaded into the end of tubular member 25 in concrete unit 23 to prepare for the joining of the next concrete unit. In order to facilitate entry of the insert member, a slot 59 is provided in the face of the insert member into which a bladed tool can be inserted in order to easily rotate the insert member into position.

Figure 4:
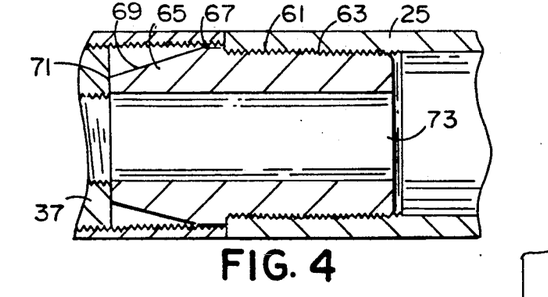
FIG. 4 is a sectional view of a second embodiment of a guide member.

Now referring to FIG. 4, a second embodiment of the guide member 61 is shown. Like guide member 45, guide member 61 has a threaded portion 63 and a shaped portion 65. Shaped portion 65 has a compound surface with a circumferential shear band 67 adjacent the end of tubular member 25 and a sloping surface portion 69 which ends at face 71. The overall configuration of the shaped surface is that of a truncated cone with the circumferential sheaf band surrounding the base of the cone. Guide member 61 has an axial aperture or bore 73 through which a bolt 58 can be passed for insertion into and tightening into insert member 37.

Figure 2:
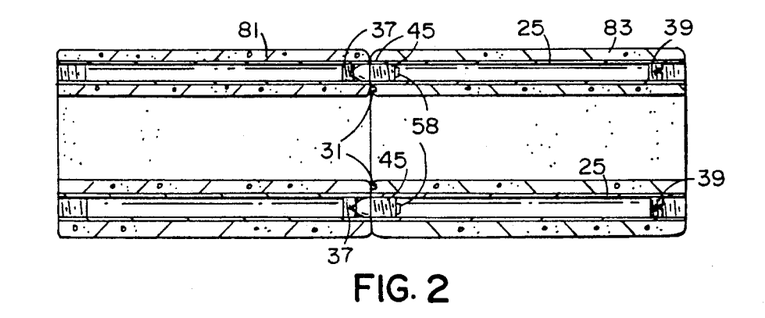
FIG. 2 is a sectional view showing two precast concrete pipes joined together.

As shown in FIG. 2, sections of precast concrete pipe 81 and 83 are joined together by insert members 39, guide members 45 and bolts 58. A gasket 31 surrounds the 10 fluid passage in the connected pipes and is positioned between the fluid passage and the connecting hardware to protect the hardware from water or corrosive materials which might be passing through the pipe. As previously discussed, the pipe sections are connected from left to right with the joint being made and the bolt being inserted through guide member 45 into internally threaded insert member 39 and then tightened. Moving to the right after the joint is fastened together, an insert member 37 is inserted into the internally threaded end 27 of tubular members 25 in ? preparation for making the next joint. Insert member 37 is added after bolt 58 is tightened to secure the previously assembled joint. The insert member substantially closes the tubular member once the joint is complete.

In order to provide a fluid-tight joint, whether it be between pipe sections or sections of decking or pavement, a resilient gasket is preferably placed between the concrete units. Using the resilient gasket, a fluid-tight joint can be made without the addition or use of mortar or asphalt to seal the faces of the concrete sections forming the joint. The gasket is preferably made of a dense rubber-like polymeric material which can resist decomposition by water or, in the case of a pipe, whatever material is passing through the pipe.

Figures 5, 6:
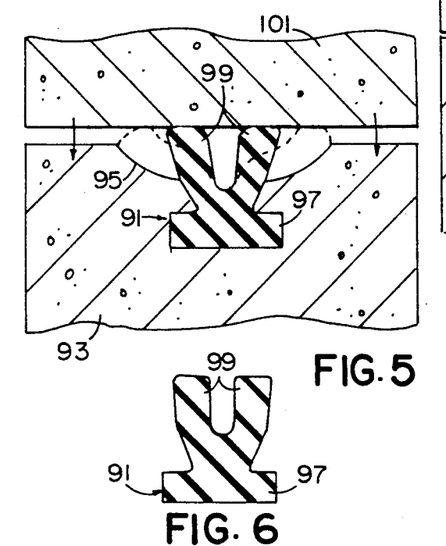
FIG. 5 is a sectional view of a cast-in-place gasket as a joint is being closed.
FIG. 6 is a cross-sectional view of a gasket which is cast in place when in use.
Figures 7, 10A:
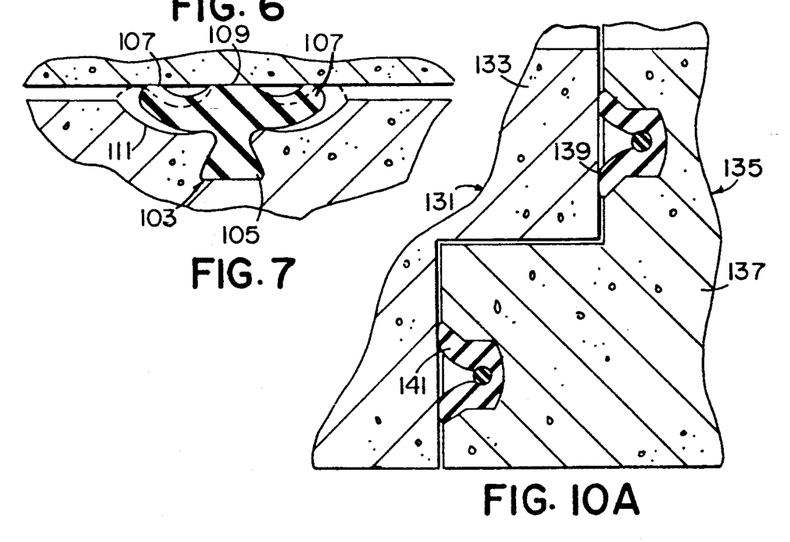
FIG. 7 is a sectional view of a second embodiment of a cast-in-place gasket.
FIG. 10A is a sectional view showing possible positions for placement of a gasket in a male and female pipe joint.

As previously mentioned, the resilient gasket can be cast in place in the concrete unit when the unit is formed or can be added to a groove formed in the concrete unit. Referring to FIGS. 5, 6 and 7, two embodiments of a cast-in-place gasket are illustrated. In FIG. 5, the resilient gasket 91 has been cast in place in a concrete unit 93. The surface of the concrete unit has a concave depression 95 in which the gasket is centered. The cast-in-place gasket has a substantially rectangular base portion 97 which locks the gasket in place in the body of concrete. Extending upwardly, as shown in FIG. 5, are a pair of spaced resilient legs 99 which form the seal between concrete units 93 and 101. The concave depression in the surface of concrete unit 93 enables legs 99 to bend backward or away from each other, as shown in phantom. As illustrated in FIG. 5, concrete unit 101 is vertically descending upon concrete unit 93 and gasket 91. The force spreads legs 99 of the gasket outwardly. If concrete unit 101 were entering either from the left or right, depression 95 provides room for the legs 99 to bend to the left or right in a windshield wiper-like manner to form the seal. The depression provides room to accommodate the legs of the gasket so that they are not crushed in forming the joint. The legs of the gasket are substantially retained in shape to push against the surface of concrete unit 101 forming a liquid-tight seal.

The resilient cast-in-place gasket 103 (FIG. 7) has a substantially triangular base portion 105 with a pair of upstanding spaced legs 107 and a center crown 109 along one edge of the gasket. The triangular base portion is cast in place in the concrete which again has a relieved or concave surface portion 111 to enable legs 107 to move maintaining a fluid-tight seal without being crushed by the mass of the concrete units.

Figure 8:
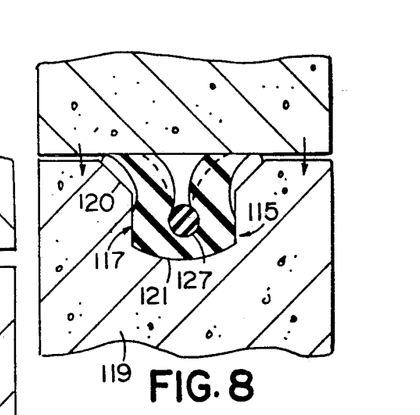
FIG. 8 is a sectional view of an inserted gasket in place between two precast concrete units as a joint is being formed.
Figure 9A:
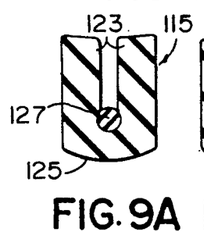
FIG. 9A is a cross-sectional view of a gasket for insertion into a groove formed in a concrete unit.

Now referring to FIGS. 8 and 9A, a gasket 115 is shown which is inserted into a groove 117 which is formed in the surface of concrete unit 119 when it is cast. Groove 117 has a relieved surface 120 with angled walls. The bottom of the groove 121 is arcuately shaped. Gasket 115 has a pair of spaced legs 123 and an arcuate back portion 125 which substantially conforms to the arcuate configuration of base portion 121 of groove 117. In FIGS. 8 and 9A, a cord of polymeric material 127, commonly referred to as an O-ring cord, is shown in place at the bottom of the groove formed between spaced legs 123. In using gasket 115, the gasket is pushed into groove 117 in the surface of the concrete unit. The cord of polymeric material 127 is then lubricated with a water or soap solution to facilitate entry of the cord between the spaced legs of the gasket. The gasket and the cord are each made of resilient rubber-like material and it is very difficult to insert cord 127 between legs 123 in view of the friction which results from trying to move the rubber-like materials across each other. The water soluble lubricant or soap solution facilitates the entry of the cord into the bottom of the groove where it can spread the legs of the gasket, as shown in FIG. 8, to tightly lock the gasket against the sidewalls of groove 117. Once gasket 115 is placed in the groove in the concrete surface of the concrete unit, and is locked in place by cord 127, it is extremely difficult to pull the gasket out of the groove. The gasket, as shown in FIGS. 8 and 9A, is the preferred gasket since it can be added at the construction site at the last moment before the concrete units are joined together. This maintains the integrity of the gasket and avoids possible damage to the gasket which might occur in shipping and handling.

Figure 9B:
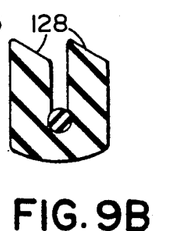
FIG. 9B is a gasket similar to that of FIG. 9a with shaped edges.

The gasket shown in FIG. 9B has sloping edge portions 128. This gasket is preferably used in joining concrete units where the edges will be pushed over like a wiper blade. The sloping end surfaces will tend to align with the face of the concrete unit forming a long seal of material.

Figure 10B:
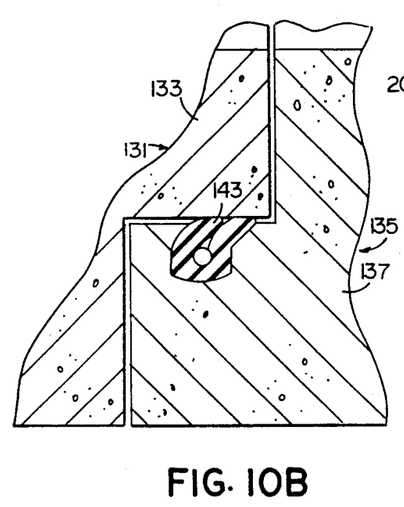
FIG. 10B is a sectional view showing a gasket on a substantially horizontal surface in a male and female joint.

Now referring to FIGS. 10A and 10B, a conventional male and female pipe joint is shown as commonly used with round, precast concrete pipe. In this type of joint, a first pipe section 131 would have an offset portion 133 while a second concrete pipe 135 would have a tapered portion 137. The tapered end is inserted into the opening bounded by the offset portion. By using the gasket material of the present invention, as shown in FIGS. 10A and 10B, the male and female pipe connections can be made without the necessity of the use of mortar or asphalt which tend to deteriorate over time causing the joint to leak. As shown in FIG. 10A, two positions are available for use with the resilient gasket. Gasket 139 is spread open as is gasket 141 by the direct force of the female portion of the pipe pressing against the male portion of the second pipe. Gasket 141 is positioned on the face of the tapered portion while gasket 139 is on the face of a surrounding shoulder. Turning to FIG. 10B, gasket 143 is on the top surface of the tapered portion and one leg is bent over the O-ring cord material in a windshield wiper-like manner as the two pipes telescope together. The two legs are bent over within the recessed portion of the groove and provide a fluid-tight seal for the pipe.

Figure 11:
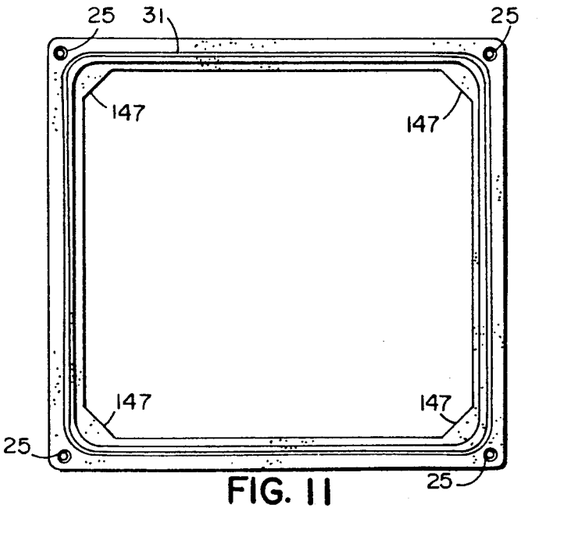
FIG. 11 is a sectional view of a section of precast concrete box pipe having a tubular member embedded in each corner.

In FIG. 11, view of a precast concrete box pipe is shown. The pipe is substantially square and has a tubular member 25 cast in each corner of the pipe between the edge of the pipe and the haunch 147 of the pipe. The tubular member is cast in the concrete as far away from the axial center of the pipe as possible consistent with the strength of the concrete surrounding the tubular member. A gasket 31 is o the face of the pipe and is between the fluid passage and tubular members 25 where the joining hardware is assembled. Mounting the gasket in this position prevents any liquid material from contacting the connecting or joining hardware protecting the hardware from rust or corrosion.

Figure 12:
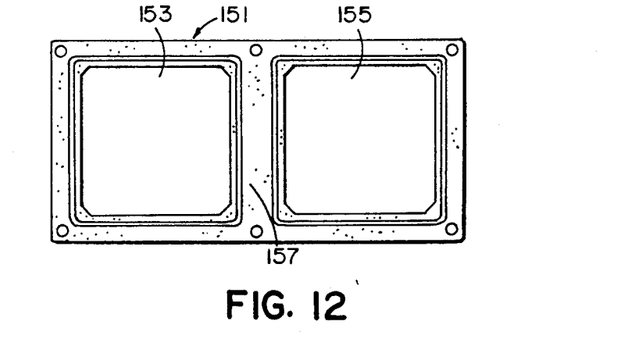
FIG. 12 is a sectional view of a double precast concrete box pipe having a common wall between each pipe.
Figure 13:
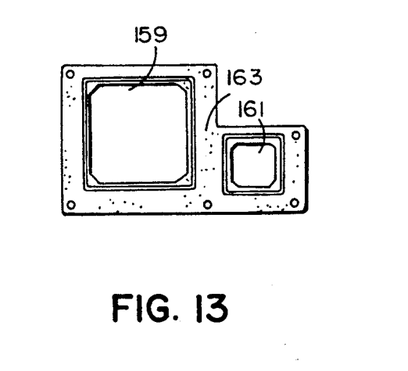
FIG. 13 is a sectional view of a double precast concrete box pipe having a common wall between each pipe and with the pipes being of different sizes.

In FIG. 12, a double box pipe 151 is shown having a fluid passage 153 and 155 separated by a common wall 157. In FIG. 13, a similar construction is shown; however, fluid passage 159 is substantially larger than fluid passage 161. Again, the two fluid passages are separated by a common wall 163 and resilient gaskets which prevent mixing or intermingling of the two fluid streams. The double wall or the double box pipe construction is particularly useful in handling both storm drains and sewage. The two fluid materials are separated in their passage through the pipe and can be treated separately at the treatment center where they exit the pipe. By use of the double walled pipe, the expense of laying two adjacent pipes is reduced, as well as the time spent in excavating a large trench for handling two pipes. By providing a common wall between the two pipes, the width of the pipe assembly is substantially reduced.

Figure 14:
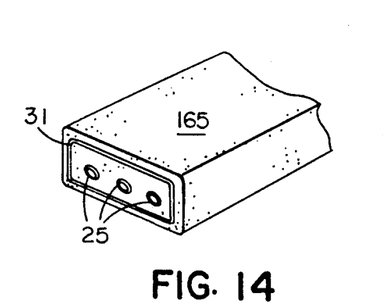
FIG. 14 is a partial perspective view of a section of precast pavement.

Referring now to FIG. 14, a precast section of pavement 165 is shown which can be used in highway or bridge construction. The pavement section has a plurality of tubular members 25 cast into the concrete. A gasket 31 surrounds the tubular members since water and other corrosive materials would tend to flow from the surface toward the hardware used to assemble the pavement sections.

Figure 15:
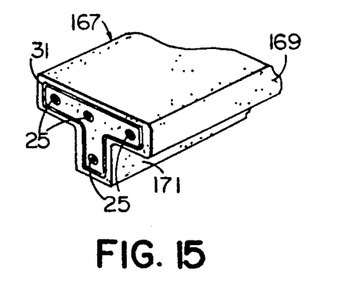
FIG. 15 is a partial perspective view of a section of precast decking.

In FIG. 15 a precast concrete section of T-type decking 167 is shown which is of the type frequently used in the construction of building and parking structures. The section of decking has a wide, substantially flat top 169 which is supported by a vertical section 171. A plurality of tubular members 25 have been cast into the section of decking. A gasket 31 surrounds the tubular member since, like pavement section 165, water and other corrosive materials will tend to flow down from the surface onto the connecting hardware used to assemble the decking.

Figure 16:
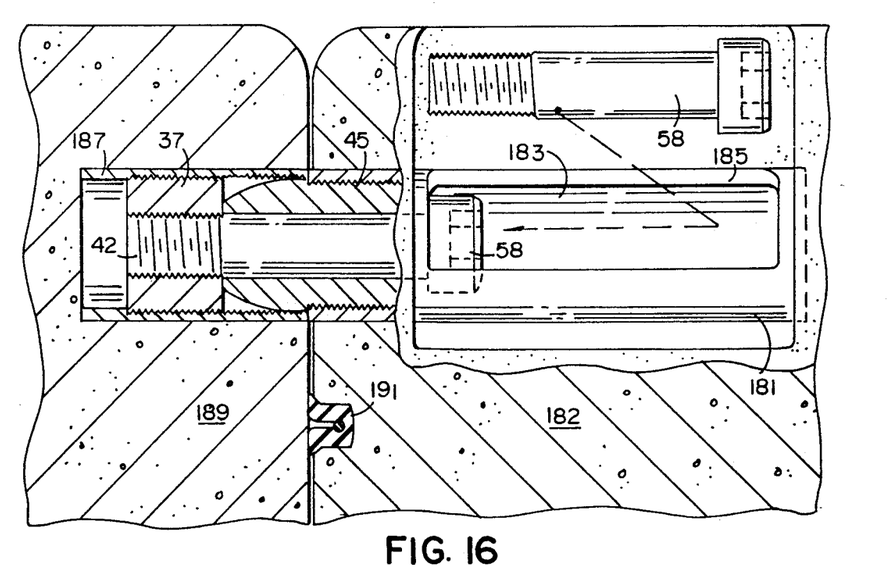
FIG. 16 is a fragmentary view of a concrete unit having a bolt window in the tubular member to facilitate the positioning of the shear bolt.

Referring to FIG. 16, a second embodiment of the apparatus for joining precast concrete units is shown, for purposes of illustration, in a corner of a precast box pipe. A shortened tubular member 181 has been cast into the corner of box pipe section 182 having a bolt window 183 bounded by edge 185. A guide member 45 is positioned in the end of tubular member 181, as previously described. Since the bolt window is provided for inserting shear bolt 58, the tubular member does not have to extend fully across the concrete unit for insertion of the bolt into guide member 45 and on through into threaded aperture 42 in insert member 37. Insert member 37 is positioned in a shortened tubular member 187 positioned in a corner of a second precast concrete box pipe 189. A resilient gasket 191 provides a watertight seal for the joint.

Figure 17:
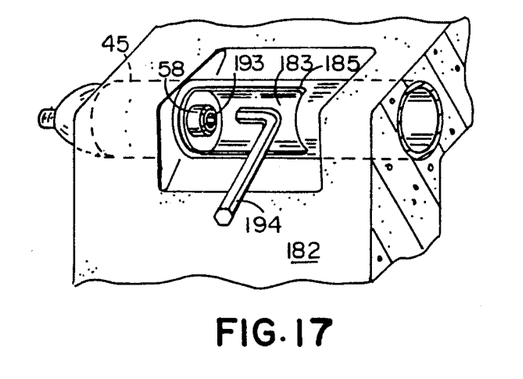
FIG. 17 is a partial perspective view of a concrete unit having a bolt window and showing the shear bolt positioned in the guide member.

In making the section of concrete box pipe 182, and referring to FIG. 17, bolt window 183 can be covered or filled with polystyrene or other suitable material to prevent concrete from entering into tubular member 181 through aperture 185 which defines the bolt window. The concrete can then be poured to form the box pipe.

After the concrete has hardened, the cover can be removed to provide access to the rear of guide member 45 for shear bolt 58. The head of bolt 58 has a shaped socket 193 for receiving a Allen-type wrench 194 for tightening bolt 58 into position. After the joint has been completed the bolt window and portion of concrete unit 182 can be filled with concrete and shaped to conform to the rest of the corner of the concrete unit. If it is intended that the concrete units can be disassembled, the bolt window can be covered and then the concrete corner can be completed.

Figure 18:
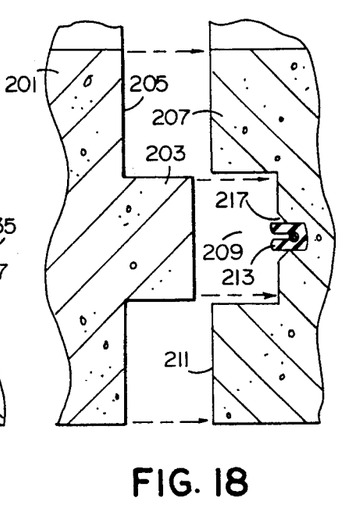
FIG. 18 is a schematic elevational view of a keyway joint including a gasket.

When joint is made between two precast concrete units using the hardware of the present invention, the shear band on the guide member and the bolt provide the shear strength for the joint. It is within the scope of the present invention to provide a further increase in shear strength by shaping the end faces of the concrete units in a tongue-and-groove manner, as shown in FIG. 18. Concrete unit 201 has a projecting key 203 on the end face 205. A second concrete unit 207 has a recess or keyway 209 formed in surface 211. A resilient gasket 213 is mounted in a shaped groove 215 which has a relieved surface 217 on either side of the groove.

When units 201 and 207 are joined together by hardware (not shown) in order to simplify the drawing, key 203 will be positioned in keyway 209. The face of key 203 will press against gasket 213 to provide a fluid-tight seal while the tongue-and-groove fit of 203 and 209 will substantially increase the shear strength of the joint between the concrete units.

It can be seen from the above description that an improved apparatus is provided for connecting precast concrete units. The units can be connected using hardware installed on site and are tightly fastened together by bolts. The use of bolts substantially simplifies the assembly of the precast concrete units into whatever structure is desired. Also, the precast concrete units can be prepared under substantially identical conditions so that each section cures the same way. This is important in pavement sections since the individual sections will expand or contract to the same extent, avoiding unnecessary ridges and bumps which normally occur in highway sections poured at different times of day under different sunlight and moisture conditions.

Although the invention has been described with respect to specific preferred embodiments thereof, many variations and modifications will become apparent to those skilled in the art. It is, therefore, the intention that the appended claims be interpreted as broadly as possible in view of the prior art to include all such variations and modifications.

The embodiments of the invention in which an exclusive property or privilege is claimed are defined as follows:

1. A method for assembling concrete units together comprising the following steps:
   providing first and second precast concrete units each with a plurality of spaced longitudinally aligned tubular members therein;
   providing a guide member projecting from one end of each of said tubular members in said first precast concrete unit, each of said guide members having a first portion mounted in its associates said tubular member to fix said guide member against lateral movement with respect to said first precast concrete unit, and a second portion having a sloping surface to facilitate entry into a tubular member in said second precast concrete unit, said guide member having an axial aperture therein;
   inserting an insert member into an end of each of said tubular members in said second precast concrete unit, each of said insert members having means for engaging a fastener member inserted therein;
   bringing said first and second concrete units together so that said second portion of each of said guide members in said first concrete unit is inserted into the end of each of said tubular members having said insert member therein in said second concrete unit;
   passing a fastener member through said axial aperture in said guide member into said engaging means in said insert member; and
   securing said fastener member in said insert member to join said first and second precast concrete units together.

2. A method for assembling concrete units together as set forth in claim 1, wherein said guide member and said insert member are threaded into the ends of said tubular members of said first concrete unit and said second concrete unit respectively.

3. An assembly comprising:
a first precast concrete unit having end surfaces;
a second precast concrete unit having end surfaces;
a plurality of tubular members extending within each of said first and second concrete units, said tubular members being aligned with the longitudinal axis of said concrete units and being open at each end surface of said concrete units;
a guide member mounted in the same end of each tubular member in said first concrete unit, fixed against lateral movement with respect to said first concrete unit, and said guide member having an axial aperture therein wherein one of said guide members extends into one of said tubular members of said second concrete unit in close fitting lateral relationship whereby said guide member locks said first and second concrete units against lateral movement relative to one another;
an insert member mounted within the same end of each tubular member in said second concrete unit, said insert member having means for engaging a fastener member inserted therein;
a resilient gasket member supported on an end of said first or second concrete units; and
a fastener member extending through the axial aperture in said guide members into said engaging means in said insert member, said fastener members joining said first and second concrete units together, compressing said resilient gasket member between said end surfaces forming a liquid sealed assembly of said first and second concrete units.

4. An assembly as set forth in claim 3, wherein the end surface of said concrete unit supporting said resilient gasket is relieved adjacent said gasket to enable said gasket to flex.

5. An assembly as set forth in claim 4, wherein said end surface on each side of said resilient gasket is concave.

6. An assembly as set forth in claim 4, wherein said end surface on each side of said resilient gasket is angled downward from said surface to said gasket.

7. A precast concrete structural assembly comprising:
a first precast concrete structural unit having end faces substantially perpendicular to the longitudinal axis of said structural unit;
a second precast concrete structural unit having end faces substantially perpendicular to the longitudinal axis of said structural unit;
gasket means between the facing end faces of said structural units for forming a fluid-tight seal between said structural units; and
at least two spaced shear members extending between said first and second structural units, said shear members being fixed against lateral movement with respect to said structural units whereby said shear members resist shear forces created as one or the other of said first and second structural units shifts laterally with respect to the other and with respect to said longitudinal axis, said shear members thereby protecting said gasket means from being stressed by shear forces; at least two tightenable fasteners, in addition to said shearmembers, which extend between and join said two structural units and which are tightened to place said gasket means in compression.

8. The structural assembly of claim 1 in which said gasket means is positioned within a groove in one end face of said first structural unit, from which groove it projects and engages directly the adjacent end face of said second structural unit without projecting into any receiving groove in said adjacent end face of said second structural unit.

9. The structural assembly of claim 8 in which said first and second structural units are tubular members having longitudinal openings therein, said gasket extending completely around end face of said first structural tubular member.

10. The structural assembly of claim 9 in which each of said structural units includes a tubular opening in its end faces associated with each of said shear members;
each of said shear members comprising a guide member located in and projecting from said tubular opening in one of said end faces of each of said first and second structural units, said guide member projecting into a correspondingly located tubular opening comprising said receiving aperture in the adjacent structural unit;
said tightenable fasteners comprising a bolt extending through said axial aperture in said guide member and into a threaded insert mounted within said corresponding opening in said adjacent end face of said adjacent structural unit, whereby said guide means and said bolt resist shear forces resulting from relative shifting of said first and structural units.

11. The structural assembly of claim 8 in which each of said structural units includes a tubular opening in its end faces associated with each of said shear members;
each of said shear members comprising a guide member located in and projecting from said tubular opening in one of said end faces of each of said first and second structural units, said guide member projecting into a correspondingly located tubular opening comprising said receiving aperture in the adjacent structural unit;
said tightenable fasteners comprising a bolt extending through said axial aperture in said guide member and into a threaded insert mounted within said corresponding opening in said adjacent end face of said adjacent structural unit, whereby said guide means and said bolt resist shear forces resulting from relative shifting of said first and second structural units.

12. The structural assembly of claim 7 in which each of said structural units includes a tubular opening in its end faces associated with each of said shear members;
each of said shear members comprising a guide member located in and projecting from said tubular opening in one of said end faces of each of said first and second structural units, said guide member projecting into a correspondingly located tubular opening comprising said receiving aperture in the adjacent structural unit;
said tightenable fasteners comprising a bolt extending through said axial aperture in said guide member and into a threaded insert mounted within said corresponding opening in said adjacent end face of said adjacent structural unit, whereby said guide means and said bolt resist shear forces resulting from relative shifting of said first and second structural units.

13. An assembly comprising:
a first precast concrete unit having end surfaces;

a second precast concrete unit having end surfaces;

a plurality of tubular members extending through each of said first and second concrete units, from one end surface thereof to the other, said tubular members being aligned with the longitudinal axis of said concrete units and being open at each end surface of said concrete units;

a guide member mounted in the same end of each tubular member in said first concrete unit, fixed against lateral movement with respect to said first concrete unit, and said guide member having an axial aperture therein;

said guide member projecting into close fitting lateral relationship in a corresponding tubular member in said second concrete unit;

an insert member mounted within the same end of each tubular member in said second concrete unit, said insert member having means for engaging a fastener member extending thereinto;

a resilient gasket supported on an end of said first or second concrete unit and engaging the adjacent end surface of the adjacent precast concrete unit; and a fastener member extending through said axial aperture in said guide member into said insert member, said fastener members joining said first and second concrete units together comprising said resilient gasket between said end surfaces to form a sealed assembly of said first and second concrete units.

14. The precast concrete assembly of claim 13 in which each of said guide members projects from its associated tubular member past the end surface of its precast concrete unit and into the tubular member in the adjacent precast concrete unit.

* * * * *

UNITED STATES PATENT AND TRADEMARK OFFICE
CERTIFICATE OF CORRECTION

PATENT NO. : 5,309,691     Page 1 of 2

DATED : May 10, 1994

INVENTOR(S) : Tolliver et al.

It is certified that error appears in the above-indentified patent and that said Letters Patent is hereby corrected as shown below:

Column 3, line 24
"ca" should be --can--;

Column 3, line 34
"ar" should be --are--;

Column 3, line 38
"®nd" should be --end--;

Column 4, line 30
"member 39" should be --member 37--;

Column 4, line 32
"member 39" should be --member 37--;

Column 4, line 32
"s" should be --58--;

Column 4, line 35
"member 39" should be --member 37--;

Column 4, line 53
"sheaf" should be --shear--;

Column 4, line 59
After "the" delete --10--;

Column 4, line 66
"member 39" should be --member 37--;

Column 5, line 1
After "in" delete --? 20--;

UNITED STATES PATENT AND TRADEMARK OFFICE
CERTIFICATE OF CORRECTION

PATENT NO. : 5,309,691
DATED : May 10, 1994
INVENTOR(S) : Tolliver et al.

It is certified that error appears in the above-indentified patent and that said Letters Patent is hereby corrected as shown below:

Column 5, line 23
After "concave" delete --10--;

Column 6, line 54
"o" should be --on--;

Column 8, line 45, Claim 1
"associates" should be --associated--;

Column 10, Claim 9, line 11
After "around" insert --said--.

Signed and Sealed this

Twenty-ninth Day of November, 1994

Attest:

BRUCE LEHMAN

Attesting Officer

Commissioner of Patents and Trademarks